(12) United States Patent
Chang et al.

(10) Patent No.: US 8,283,905 B2
(45) Date of Patent: Oct. 9, 2012

(54) VOLTAGE CONVERTER AND CONTROL METHOD THEREOF

(75) Inventors: Chun-Hung Chang, Hsinchu (TW); Te-Hsien Liu, Hsinchu (TW); Jiun-Chiang Chen, Hsinchu (TW)

(73) Assignee: uPI Semiconductor Corporation, Zhubei (TW)

( * ) Notice: Subject to any disclaimer, the term of this patent is extended or adjusted under 35 U.S.C. 154(b) by 394 days.

(21) Appl. No.: 12/629,027

(22) Filed: Dec. 1, 2009

(65) Prior Publication Data

US 2011/0127977 A1    Jun. 2, 2011

(51) Int. Cl.
*G05F 1/40* (2006.01)

(52) U.S. Cl. .................................. 323/273; 323/282

(58) Field of Classification Search ............... 323/222, 323/224, 266–268, 271–274, 280, 282–286; 363/16, 17, 20, 21.08, 21.12, 41, 46, 49, 363/97, 98, 56.08, 60, 132
See application file for complete search history.

(56) References Cited

U.S. PATENT DOCUMENTS

| | | | | |
|---|---|---|---|---|
| 4,232,252 A | * | 11/1980 | Peil ................................ 315/92 |
| 5,414,341 A | * | 5/1995 | Brown ......................... 323/268 |
| 5,973,367 A | * | 10/1999 | Williams ..................... 257/365 |
| 6,992,906 B1 | * | 1/2006 | Herbert ......................... 363/127 |
| 7,023,188 B1 | * | 4/2006 | Rice ............................ 323/271 |
| 7,609,039 B2 | * | 10/2009 | Hasegawa ..................... 323/273 |
| 7,746,042 B2 | * | 6/2010 | Williams et al. .............. 323/223 |
| 7,782,027 B2 | * | 8/2010 | Williams ..................... 323/266 |

* cited by examiner

*Primary Examiner* — Rajnikant Patel

(74) *Attorney, Agent, or Firm* — Wang Law Firm, Inc.; Li K. Wang

(57) ABSTRACT

A voltage converter for converting an input voltage into an output voltage, wherein the output voltage is output to a load, is provided. An inductor is coupled between an output terminal and a node. A transistor is coupled between an input terminal and the node. A pulse width modulation (PWM) controller generates a first control signal according to the output voltage and a first reference voltage. An amplifier generates a second control signal according to the output voltage and a second reference voltage. A detector detects a loading of the load to generate a switching signal. A switching circuit selectively couples one of the PWM controller and the amplifier to the transistor according to the switching signal. The switching circuit controls the transistor according to the second control signal when the amplifier is coupled to the transistor, such that the transistor is operated in a saturation region.

20 Claims, 3 Drawing Sheets

VOLTAGE CONVERTER AND CONTROL METHOD THEREOF

BACKGROUND OF THE INVENTION

1. Field of the Invention

The invention relates to a voltage converter, and more particularly to a voltage converter which provides various control schemes according to a load thereof.

2. Description of the Related Art

Nowadays, voltage converters are widely used in various electronic products, such as portable electronic products, computer products, and so on. Operating time of an electronic product is determined according to conversion efficiency of a voltage converter therein.

A pulse width modulation (PWM) controller is one type of control scheme for a continuous time voltage converter, which generates a PWM signal to control a transistor coupled to an output inductor of the voltage converter. By adjusting the duty cycle of the PWM signal, the PWM controller controls the transistor to turn on or off. Thus, the voltage converter may continually output voltage within a specific voltage range. For example, the PWM controller increases the duty cycle of the PWM signal when a load of the voltage converter is heavy. On the contrary, the PWM controller decreases the duty cycle of the PWM signal when the load of the voltage converter is light.

When the load of the voltage converter is light, the voltage converter may control the PWM signal at a minimal duty cycle. However, a continuous PWM signal requires power for the voltage converter, thereby decreasing the conversion efficiency of the voltage converter.

Therefore, a voltage converter which has improved conversion efficiency in a light load condition is desired.

BRIEF SUMMARY OF THE INVENTION

A voltage converter and a control method thereof are provided. An exemplary embodiment of a voltage converter for converting an input voltage into an output voltage, wherein the output voltage is output to a load is provided. The voltage converter comprises an input terminal receiving the input voltage, an output terminal outputting the output voltage to the load, an inductor coupled between the output terminal and a node, a first transistor coupled between the input terminal and the node, a pulse width modulation (PWM) controller, an amplifier, a detector and a switching circuit. The PWM controller generates a first control signal according to the output voltage and a first reference voltage. The amplifier generates a second control signal according to the output voltage and a second reference voltage. The detector detects a loading of the load to generate a switching signal. The switching circuit selectively couples one of the PWM controller and the amplifier to the first transistor according to the switching signal. The switching circuit controls the first transistor according to the second control signal when the amplifier is coupled to the first transistor, such that the first transistor is operated in a saturation region.

Furthermore, an exemplary embodiment of a control method for a voltage converter comprising a transistor and an inductor is provided. The voltage converter converts an input voltage received by the transistor into an output voltage via the inductor and outputs the output voltage to a load. It is determined whether the voltage converter is operating in a light load condition by detecting a loading of the load. The transistor is controlled to operate in a saturation region when the voltage converter is operating in the light load condition. The transistor is controlled to operate in a linear region or a cut-off region when the voltage converter is not operating in the light load condition.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
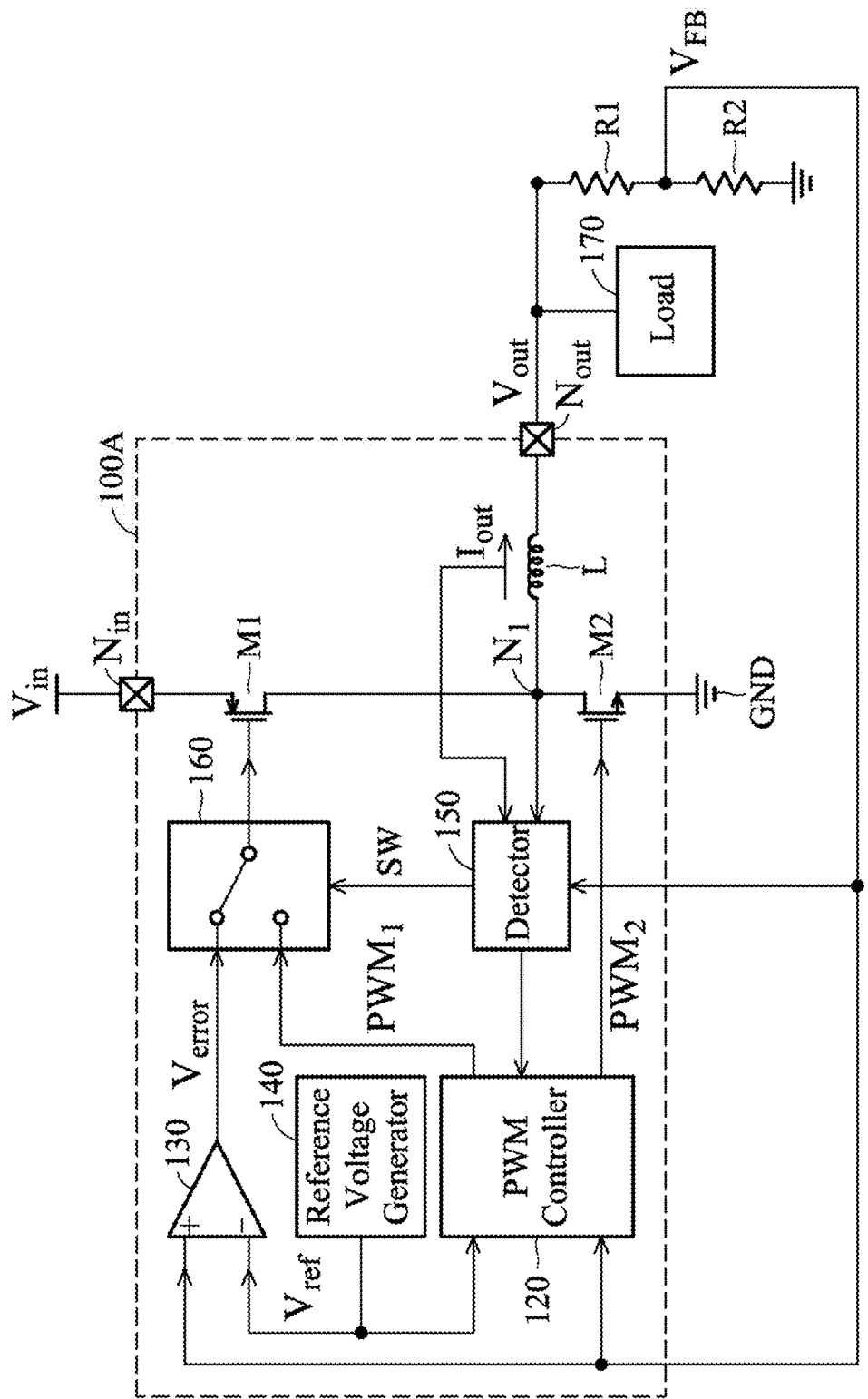
FIG. 1A shows a voltage converter according to an embodiment of the invention.

FIG. 1A shows a voltage converter 100A according to an embodiment of the invention. The voltage converter 100A converts an input voltage $V_{in}$ received from an input terminal $N_{in}$ into an output voltage $V_{out}$, and provides the output voltage $V_{out}$ to a load 170 via an output terminal $N_{out}$. As shown in FIG. 1A, the voltage converter 100A comprises a transistor M1, a transistor M2, an inductor L, a pulse width modulation (PWM) controller 120, an amplifier 130, a reference voltage generator 140, a detector 150 and a switching circuit 160. The transistor M1 is coupled between the input terminal $N_{in}$ and a node $N_1$, and the transistor M2 is coupled between the node $N_1$ and a ground GND. The inductor L is coupled between the node $N_1$ and the output terminal $N_{out}$. In the voltage converter 100A, a current $I_{out}$ is generated and sensed from the inductor L by controlling the operation statuses of the transistors M1 and M2, so as to provide the output voltage $V_{out}$ to the load 170 through the output terminal $N_{out}$. In addition, a voltage $V_{FB}$ is generated by dividing the output voltage $V_{out}$ through the resistors R1 and R2. The voltage $V_{FB}$ is fed back to the voltage converter 100A to control the operation statuses of the transistors M1 and M2, such that the output voltage $V_{out}$ is maintained within a specific voltage range. For example, the output voltage $V_{out}$ is maintained between a first voltage value and a second voltage value, wherein the first voltage value is larger than the second voltage value and a voltage difference between the first and second voltage values is determined according to actual applications. In one embodiment, the first voltage value is substantially equal to the second voltage value.

In the voltage converter 100A, the PWM controller 120 generates the PWM signals $PWM_1$ and $PWM_2$ according to the feedback voltage $V_{FB}$ and a reference voltage $V_{ref}$ provided by the reference voltage generator 140. Furthermore, the amplifier 130 generates a signal $V_{error}$ according to the feedback voltage $V_{FB}$ and the reference voltage $V_{ref}$. In the embodiment, the amplifier 130 is an error amplifier, and the signal $V_{error}$ is an analog error signal. In addition, in other embodiments, the reference voltage generator 140 may provide different reference voltages to the PWM controller 120 and the amplifier 130 according to various designs and applications. The detector 150 detects and determines a loading of the load 170 according to the feedback voltage $V_{FB}$, the current $I_{out}$ or a voltage of the node $V_f$. Next, the detector 150 provides a switching signal SW to the switching circuit 160 according to the detected loading of the load 170. Next, the switching circuit 160 couples the amplifier 130 to a control terminal of the transistor M1 or couples the PWM controller 120 to the control terminal of the transistor M1 according the switching signal SW. Therefore, the transistor M1 is controlled by the signal $V_{error}$ or the PWM signal $PWM_1$, and the transistor M2 is controlled by the PWM signal $PWM_2$.

In FIG. 1A, when it is detected that the loading of the load 170 has increased, i.e. a heavy load condition, the detector 150 generates the switching signal SW, and transmits it to the switching circuit 160, so as to control the switching circuit 160 to couple the PWM controller 120 to the transistor M1, and then the transistor M1 is controlled by the PWM signal $PWM_1$. Thus, the transistor M1 is operated in a linear region or a cut-off region, i.e. the transistor M1 is turned on or turned off. It is to be noted that the transistor M1 and transistor M2 are synchronously switched for the voltage converter 100A in a heavy load condition. For example, the transistor M2 is turned off when the transistor M1 is turned on, and the transistor M2 is turned on when the transistor M1 is turned off. In addition, when it is detected that the loading of the load 170 has decreased, i.e. a light load condition, the detector 150 generates the switching signal SW, and transmits it to the switching circuit 160, so as to control the switching circuit 160 to couple the amplifier 130 to the transistor M1, and then the transistor M1 is controlled by the signal $V_{error}$. Thus, the transistor M1 is operated in a saturation region. It is to be noted that the transistor M2 is turned off in a light load condition.

As described above, the detector 150 determines that the voltage converter 100A is operating in a light load condition or a light load condition according to the output voltage $V_{out}$, the current $I_{out}$ or the voltage of the node $N_1$. For example, a voltage value of the output voltage $V_{out}$ may decrease immediately when the loading of the load 170 is increased. Therefore, when the output voltage $V_{out}$ is decreased to a voltage level that is smaller than a second voltage value, the detector 150 determines that the voltage converter 100A is operating in a heavy load condition according to the feedback voltage $V_{FB}$ which is a divided voltage of the output voltage $V_{out}$. Next, the detector 150 controls the switching circuit 160 to couple the PWM controller 120 to the transistor M1. In the meantime, the PWM controller 120 adjusts the duty cycles of the PWM signals $PWM_1$ and $PWM_2$ to control the operation statuses of the transistors M1 and M2 according to the feedback voltage $V_{FB}$, such that the output voltage $V_{out}$ is maintained between the first voltage value and the second voltage value. Similarly, when the current $I_{out}$ is increased to a current level that exceeds a first current value, the detector 150 determines that the voltage converter 100A is operating in a heavy load condition according to the current $I_{out}$, and then the detector 150 controls the switching circuit 160 to couple the PWM controller 120 to the transistor M1. In addition, the detector 150 also controls the PWM controller 120 to adjust the duty cycles of the PWM signals $PWM_1$ and $PWM_2$, such that the current $I_{out}$ is maintained between a first current value and the second current value. The first current value is larger than the second current value, and a current difference between the first and second current values is determined according to actual applications. In one embodiment, the first current value is substantially equal to the second current value.

Furthermore, the detector 150 determines that the voltage converter 100A is operating in a light load condition according to the feedback voltage $V_{FB}$ when the output voltage $V_{out}$ is increased to a voltage level that exceeds the first voltage value. Next, the detector 150 controls the switching circuit 160 to couple the amplifier 130 to the transistor M1, so as to provide the signal $V_{error}$ to the transistor M1. Similarly, the detector 150 determines that the voltage converter 100A is operating in a light load condition according to the current $I_{out}$ when the current $I_{out}$ is decreased to a current level that is smaller than the second current value.

Figure 1B:
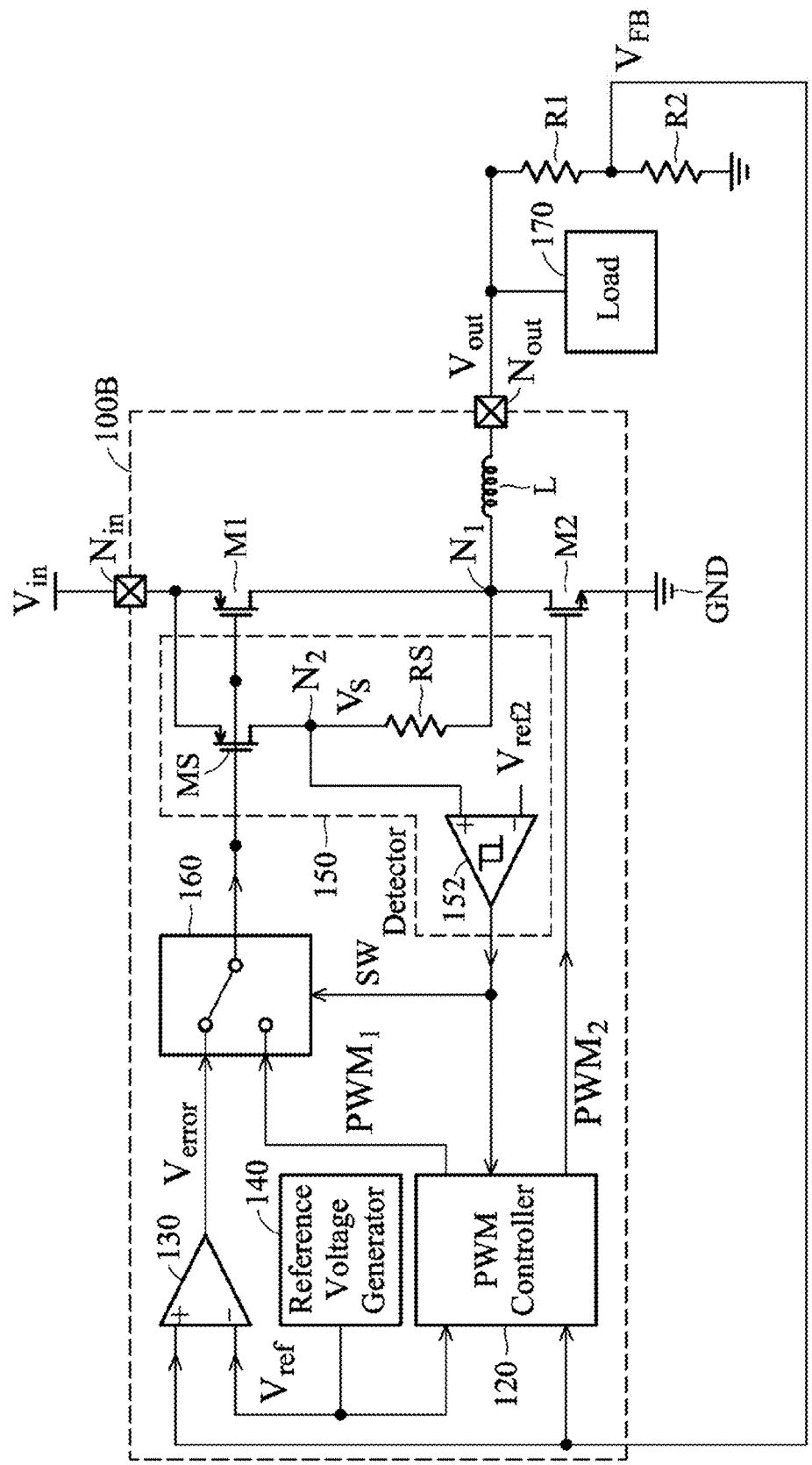
FIG. 1B shows a voltage converter according to another embodiment of the invention.

FIG. 1B shows a voltage converter 100B according to another embodiment of the invention. In FIG. 1B, the detector 150 comprises a transistor MS, a resistor RS and a comparator 152 with hysteresis. The detector 150 generates a sense signal $V_s$ according to the voltage of the node $N_1$, wherein the sense signal $V_s$ corresponds to the voltage of the node $N_1$. Next, the comparator 152 compares the sense signal $V_s$ with a reference voltage $V_{ref2}$ to generate a switching signal SW. As described above, the detector 150 is used to determine whether the voltage converter 100B is operating in a light load condition or a heavy load condition according to the voltage of the node $N_1$. When the sense signal $V_s$ is increased to a voltage level that exceeds a first transition voltage value of the comparator 152, the detector 150 determines that the voltage converter 100B is operating in a light load condition. On the contrary, the detector 150 determines that the voltage converter 100B is operating in a heavy load condition when the sense signal $V_s$ is decreased to a voltage level that is smaller than a second transition voltage value of the comparator 152, wherein the first transition voltage value is larger than the second transition voltage value. In one embodiment, the first transition voltage value is substantially equal to the second transition voltage value.

Figure 1C:
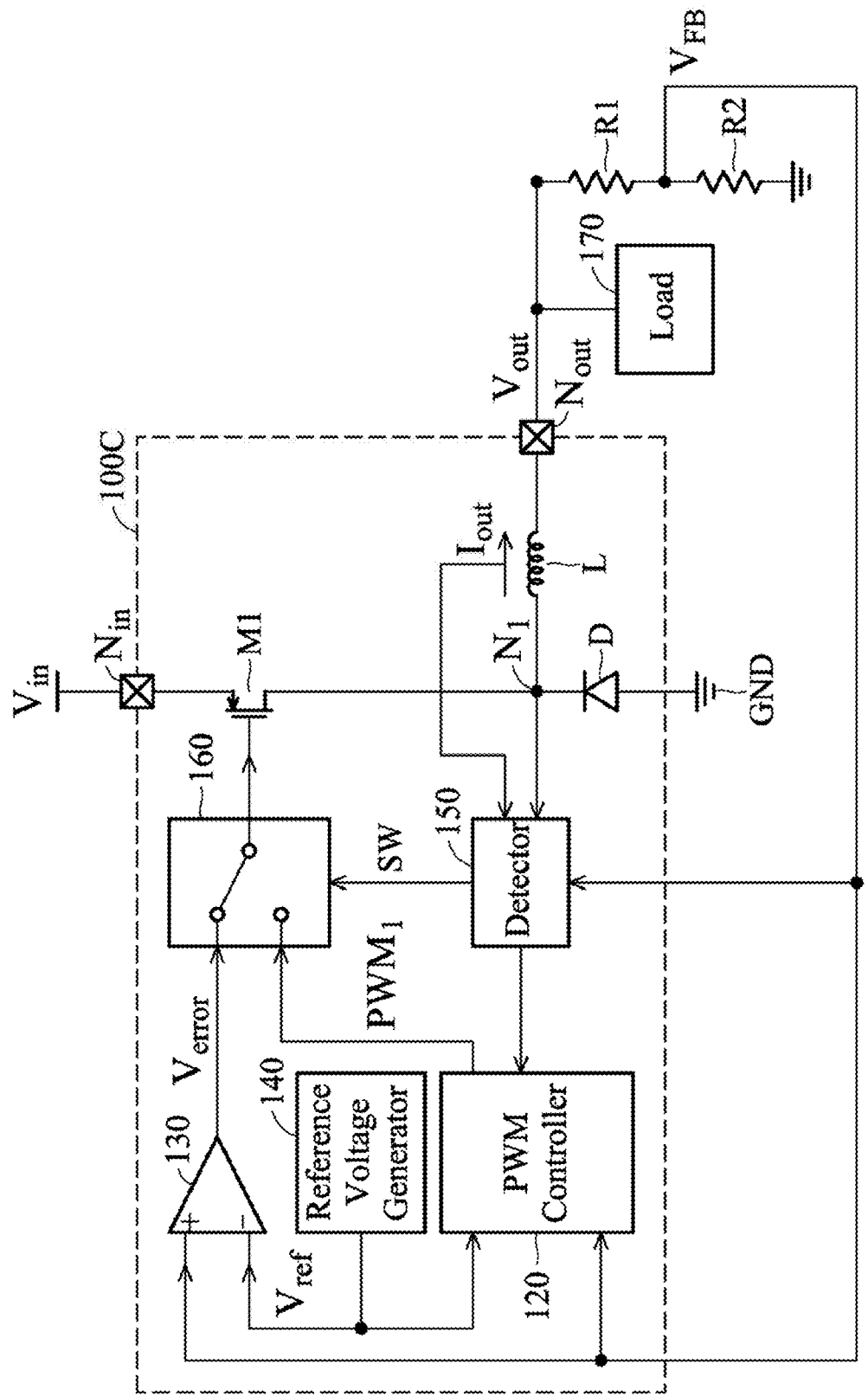
FIG. 1C shows a voltage converter according to another embodiment of the invention.

FIG. 1C shows a voltage converter 100C according to another embodiment of the invention. Compared with the voltage converter 100A of FIG. 1A, the voltage converter 100C is an asynchronous converter. In the voltage converter 100C, a diode D is coupled between the node $N_1$ and the ground GND, wherein an anode of the diode D is coupled to the ground GND and a cathode of the diode D is coupled to the node $N_1$.

The voltage converters described in the embodiments may selectively operate in a low drop out mode or a PWM mode according to loading variation of the load thereof. As described above, the voltage converter is operated in a low drop out mode when a light load condition is detected and the voltage converter is operated in a PWM mode when the light load condition is not detected, thus obtaining higher conversion efficiency for the voltage converter.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A voltage converter for converting an input voltage into an output voltage, wherein the output voltage is output to a load, comprising:

an input terminal, receiving the input voltage;

an output terminal, outputting the output voltage to the load;

an inductor coupled between the output terminal and a node;

a first transistor coupled between the input terminal and the node;

a pulse width modulation (PWM) controller, generating a first control signal according to the output voltage and a first reference voltage;

an amplifier, generating a second control signal according to the output voltage and a second reference voltage;

a detector coupled to the node, detecting a loading of the load according to a voltage of the node or a current of the inductor to generate a switching signal; and a switching circuit, selectively coupling one of the PWM controller and the amplifier to the first transistor according to the switching signal, wherein when the voltage converter operates in a light load condition, the detector controls the switching circuit to make the first transistor operating in a saturation region, wherein when the voltage converter does not operate in the light load condition, the detector controls the switching circuit to make the first transistor operating in a linear region or a cut-off region.

2. The voltage converter as claimed in claim 1, wherein the switching circuit controls the first transistor according to the second control signal when the amplifier is coupled to the first transistor, such that the first transistor is operated in the saturation region, and the switching circuit controls the first transistor according to the first control signal when the PWM controller is coupled to the first transistor, such that the first transistor is operated in the linear region or the cut-off region.

3. The voltage converter as claimed in claim 1, wherein when the output voltage exceeds a first voltage value, the switching signal generated by the detector controls the switching circuit to couple the amplifier to the first transistor.

4. The voltage converter as claimed in claim 3, wherein when the output voltage is smaller than a second voltage value, the switching signal generated by the detector controls the switching circuit to couple the PWM controller to the first transistor.

5. The voltage converter as claimed in claim 4, wherein the first voltage value is larger than or equal to the second voltage value.

6. The voltage converter as claimed in claim 1, wherein when the current of the inductor exceeds a first current value, the switching signal generated by the detector controls the switching circuit to couple the PWM controller to the first transistor.

7. The voltage converter as claimed in claim 6, wherein when the current of the inductor is smaller than a second current value, the switching signal generated by the detector controls the switching circuit to couple the amplifier to the first transistor.

8. The voltage converter as claimed in claim 7, wherein the first current value is larger than or equal to the second current value.

9. The voltage converter as claimed in claim 1, wherein when the voltage of the node exceeds a first voltage value, the switching signal generated by the detector controls the switching circuit to couple the amplifier to the first transistor.

10. The voltage converter as claimed in claim 9, wherein when the voltage of the node is smaller than a second voltage value, the switching signal generated by the detector controls the switching circuit to couple the PWM controller to the first transistor.

11. The voltage converter as claimed in claim 10, wherein the first voltage value is larger than or equal to the second voltage value.

12. The voltage converter as claimed in claim 1, further comprising a second transistor coupled between the node and a ground.

13. The voltage converter as claimed in claim 12, wherein the PWM controller further generates a third control signal to control the second transistor according to the output voltage and the first reference voltage.

14. The voltage converter as claimed in claim 13, wherein the first and third control signals are PWM signals, and the second control signal is an analog signal.

15. The voltage converter as claimed in claim 1, further comprising a diode coupled between the node and a ground, wherein an anode of the diode is coupled to the ground and a cathode of the diode is coupled to the node.

16. The voltage converter as claimed in claim 1, wherein the first reference voltage is equal to the second reference voltage.

17. The voltage converter as claimed in claim 1, wherein the amplifier is an error amplifier.

18. A control method for a voltage converter which comprises a transistor and an inductor coupled to the transistor via a node, wherein the voltage converter converts an input voltage received by the transistor into an output voltage via the inductor and outputs the output voltage, wherein the output voltage is output to a load, comprising:

detecting a loading of the load according to a voltage of the node or a current of the inductor to determine whether the voltage converter is operating in a light load condition;

controlling the transistor to operate in a saturation region when the voltage converter is operating in the light load condition; and controlling the transistor to operate in a linear region or a cut-off region when the voltage converter is not operating in the light load condition.

19. The control method as claimed in claim 18, wherein the voltage converter further comprises a amplifier for generating an analog signal to control the transistor according to the output voltage and a reference voltage such that the transistor is operated in a saturation region.

20. The control method as claimed in claim 18, wherein the voltage converter further comprises a PWM controller for generating a PWM signal to control the transistor according to the output voltage and a reference voltage such that the transistor is operated in a linear region or a cut-off region.

* * * * *